US012726722B2

(12) United States Patent
Kim et al.

(10) Patent No.: US 12,726,722 B2
(45) Date of Patent: Sep. 1, 2026

(54) ELECTRONIC SYSTEM CONFIGURED FOR IMAGE PROCESSING AND UTILIZING MULTIPLE BINARY NEURAL NETWORKS

(71) Applicant: Postech Research and Business Development Foundation, Pohang-si (KR)

(72) Inventors: Hyungjun Kim, Pohang-si (KR); Yulhwa Kim, Daegu (KR); Sungju Ryu, Busan (KR); Jae-Joon Kim, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 551 days.

(21) Appl. No.: 18/353,801

(22) Filed: Jul. 17, 2023

(65) Prior Publication Data

US 2023/0362498 A1 Nov. 9, 2023

Related U.S. Application Data

(63) Continuation-in-part of application No. 16/933,889, filed on Jul. 20, 2020, now abandoned.

(30) Foreign Application Priority Data

Jul. 23, 2019 (KR) ........................ 10-2019-0088879

(51) Int. Cl.
*H04N 23/84* (2023.01)
*G06T 7/00* (2017.01)

(52) U.S. Cl.
CPC ............... *H04N 23/84* (2023.01); *G06T 7/97* (2017.01); *G06T 2207/20084* (2013.01); *G06T 2207/20221* (2013.01)

(58) Field of Classification Search
CPC . H04N 23/84; G06T 7/97; G06T 2207/20084; G06T 2207/20221
(Continued)

(56) References Cited

U.S. PATENT DOCUMENTS 11,082,720 B2 * 8/2021 Tsai ........................ H04N 19/91
11,210,586 B1 12/2021 Duong
(Continued)

FOREIGN PATENT DOCUMENTS

JP 2019-087072 A 6/2019
KR 2018-0073118 A 7/2018
(Continued)

OTHER PUBLICATIONS

Miah et al., "Detection of lung cancer from CT image using image processing and neural network", 2nd ICEEICT 2015, May 21-23, 2015 (Year: 2015).*
(Continued)

*Primary Examiner* — Tsu-Chang Lee
(74) *Attorney, Agent, or Firm* — Morgan, Lewis & Bockius LLP

(57) ABSTRACT

An electronic system may include: a camera to capture a current image; an image processor to generate current image data items; and a splitter circuit to generate first and second images having respective first and second image data items. The splitter circuit splits each current image data item into a first image data item with a first set of bits and a second image data item with a second set of bits distinct from the first set of bits. The first and second image data items
(Continued)

correspond to two distinct precisions less than a precision of the current image data items. The electronic system may also include distinct binary neural network circuits to independently process the first and second images to generate first and second processed image data items; and a merger circuit to combine the processed image data items to recover output image data items for display.

20 Claims, 6 Drawing Sheets

(58) Field of Classification Search
USPC .......................................................... 706/15
See application file for complete search history.

(56) References Cited

U.S. PATENT DOCUMENTS

| | | | | |
|---|---|---|---|---|
| 2017/0357891 | A1 | 12/2017 | Judd | |
| 2018/0181858 | A1 | 6/2018 | Son et al. | |
| 2019/0042513 | A1 | 2/2019 | Fleming, Jr. | |
| 2019/0138899 | A1 | 5/2019 | Hoshizuki et al. | |
| 2021/0248459 | A1 * | 8/2021 | Li | G06N 3/08 |

FOREIGN PATENT DOCUMENTS

| | | | |
|---|---|---|---|
| KR | 2019-0022237 | A | 3/2019 |
| KR | 2019-0076916 | A | 7/2019 |

OTHER PUBLICATIONS

Simons et al., "A review of binarized neural networks", Electronics, May 2019 (Year: 2019).*

B. Zhuang et al., "Structured Binary Neural Networks for Accurate Image Classification and Semantic Segmentation", Proceedings of the IEEE/CVF Conference on Computer Vision and Pattern Recognition (CVPR), 2019, pp. 413-422.

Hyungjun Kim et al., "BitSplit-Net: Multi-bit Deep Neural Network with Bitwise Activation Function", arXiv:1903.09807v1 [cs.NE], Mar. 23, 2019, pp. 1-10.

Shuchang Zhou et al., DOREFA-NET: Training Low Bitwidth Convolutional Neural Networks With Low Bitwidth Gradients, arXiv:1606.06160v3 [cs.NE], Feb. 2, 2018, pp. 1-13.

Wiki, "Image sensor", Wikipedia, 2023, https://en.wikipedia.org/wiki/Image_sensor (Year: 2023).

Lin, et al., "Towards accurate binary convolutional neural network", N IPS'2017 (Year: 2017).

* cited by examiner

FIG. 5

Input: High-precision input $x \in R^n$, number of bits k
Output: k binary activations $\{y_i\}_{i=1}^{k}$
Initialization: $\lambda_1 \leftarrow 2^k - 1, \lambda_2 \leftarrow 0, \beta_2 \leftarrow 0$
$x \leftarrow \mathrm{ReLU1}(x)$ *equals to clamp(0,1)
for $i = 1$ to k do
$\lambda_2 \leftarrow 2^{k-i}$
$\beta_i \leftarrow \frac{\lambda_2}{\lambda_1}$
$y_i \leftarrow \mathrm{Modulo}\left(\mathrm{Floor}\left(\frac{1}{\lambda_2}\mathrm{Round}(\lambda_1 x)\right), 2\right)$
$y_i \leftarrow \beta_i y_i$
end for
Return: $\{y_i\}_{i=1}^{k}$

FIG. 6

800
828A
AUs
Registers
818A
820A (P1)
806A
First Binary Neural Network Circuit
826A
824A
850
UI 855
802
803
Image Processor
DI
804
Demultiplexer Circuit
808
Merger Circuit
810
Display Circuit
806B
Second Binary Neural Network Circuit
814
DI
812
820B (P2)
818B
826B
824B
DO
816
830
828B
AUs
Registers
812A (B1)
812B (B2)
P1
P2
822A (B1)
822B (B2)
812 may include or represent 812A and/or 812B;
806: 806A and/or 806B; 818: 818A and/or 818B;
820: 820A and/or 820B; 822: 822A and/or 822B;

FIG. 9

Obtain image data including a current image corresponding to at least a million image pixels, where the current image is converted to a plurality of current image data items. 902

Generate a first image having a plurality of first image data items and a second image having a plurality of second image data items from the current image data items. 904

The first image data items and the second image data items correspond to two distinct precisions less than an image precision of the current image. 906

Split each of the plurality of current image data items into (i) a first image data item corresponding to a first set of bits representing a respective current image data item and (ii) a second image data item corresponding to a second set of bits representing the respective current image data item, where the second set of bits is distinct from the first set of bits. 908

Based on the two distinct precisions, independently and separately, apply two distinct neural networks to process the first image and the second image to generate (1) a first processed image including a plurality of first processed image data items and (2) a second processed image including a plurality of second processed image data items, respectively. 910

Combine each first processed image data item and a respective second processed image data item to generate a respective output image data item associated with an output image. 912

Cause to display the output image on a user interface of an image user application. 914

ELECTRONIC SYSTEM CONFIGURED FOR IMAGE PROCESSING AND UTILIZING MULTIPLE BINARY NEURAL NETWORKS

CROSS-REFERENCE TO RELATED APPLICATIONS

This is a continuation-in-part of U.S. patent application Ser. No. 16/933,889, filed Jul. 20, 2020, now abandoned, which claims the benefit of and priority to Korean Patent Application No. 10-2019-0088879 filed on Jul. 23, 2019, the entirety of each of which is incorporated herein by reference for all purposes.

BACKGROUND

Embodiments of the inventive concept described herein relate to data analysis, and more particularly, relate to a neural network system and operating method of the same.

Neural network system is hardware that analyzes and processes data by imitating the human brain. The neural network system may analyze and process data, based on various neural network algorithms. To reduce a memory usage and a computational amount for data analysis, a method of reducing a precision of data used in a neural network is required.

A binary neural network (BNN) is a network that represents weights and activation values of a network in 1 bit. Since the binary neural network requires a small amount of computation and less memory usage, the binary neural network may be suitable for use in an environment such as a mobile system. However, the binary neural network may have a disadvantage in that system performance decreases as precision decreases to 1 bit. Therefore, while securing an effect of reducing a computation amount and reducing a memory usage, there is a need for a neural network system capable of increasing a performance of a system and a method of operating the same.

SUMMARY

Embodiments of the inventive concept provide a neural network system and a method of operating the same, which improves data analysis performance using multiple bits and reduces a computational amount and a memory usage for data analysis.

According to an exemplary embodiment of the inventive concept, a method of operating a neural network system includes splitting input feature data into first splitting data corresponding to a first digit bit and second splitting data corresponding to a second digit bit different from the first digit bit, propagating the first splitting data through a first binary neural network, propagating the second splitting data through a second binary neural network, and merging first result data by propagation of the first splitting data and second result data by propagating the second splitting data to generate output feature data.

According to an exemplary embodiment, the splitting of the input feature data into the first splitting data and the second splitting data may include generating the first splitting data, based on a first activation function that converts the input feature data in a first reference range to a first value, and generating the second splitting data, based on a second activation function that converts the input feature data in a second reference range to a second value.

According to an exemplary embodiment, the first reference range may include a range between a half value of a valid range of the input feature data and a maximum value of the valid range, and the second reference range may include a first sub-range including at least a portion between a minimum value of the valid range and the half value and a second sub range including at least a portion between the half value and the maximum value. The first value may be greater than the second value.

According to an exemplary embodiment, the first activation function may convert the input feature data having a value less than ½ to 0, and may convert the input feature data having a value of ½ or more to ⅔, and the second activation function may convert the input feature data having a value less than ⅙ or a value from ½ to ⅚ to 0, and may convert the input feature data having a value from ⅙ to ½ or a value of ⅚ or more to ⅓.

According to an exemplary embodiment, the first digit bit may be a most significant bit, and the second digit bit may be a least significant bit.

According to an exemplary embodiment, the propagating of the first splitting data may include generating the first result data, based on an operation of a weight parameter group and the first splitting data, and the propagating of the second splitting data may include generating the second result data, based on an operation of the weight parameter group and the second splitting data. The weight parameter group includes weights of 1 bit.

According to an exemplary embodiment of the inventive concept, a neural network system includes a processor that converts input feature data into output feature data, based on a weight group parameter, and a memory that stores the weight group parameter. The processor may be configured to split the input feature data into first splitting data corresponding to a first digit bit and second splitting data corresponding to a second digit bit different from the first digit bit, to convert the first splitting data into first result data, based on a first binary neural network and the weight group parameter, to convert the second splitting data into second result data, based on a second binary neural network and the weight group parameter, and to merge the first result data and the second result data to generate the output feature data.

According to an exemplary embodiment, the first splitting data may be propagated through the first binary neural network, and the second splitting data may be propagated through the second binary neural network independently of the first splitting data.

According to an exemplary embodiment, the processor may generate the first splitting data, based on a first activation function that converts the input feature data in a first reference range to a first value, and may generate the second splitting data, based on a second activation function that converts the input feature data in a second reference range to a second value. The first reference range may include a range between a half value of a valid range of the input feature data and a maximum value of the valid range, and the second reference range may include a first sub-range including at least a portion between a minimum value of the valid range and the half value and a second sub range including at least a portion between the half value and the maximum value. The first value may be greater than the second value.

According to an exemplary embodiment, the first digit bit may be a most significant bit, and the second digit bit may be a least significant bit. According to an exemplary embodiment, a weight provided to the first binary neural network and a weight provided to the second binary neural network may be the same as the weight parameter group. The weight parameter group may include weights of 1 bit.

According to an exemplary embodiment, the processor may include a graphics processing unit.

BRIEF DESCRIPTION OF THE DRAWINGS

The above and other objects and features of the inventive concept will become apparent by describing in detail exemplary embodiments thereof with reference to the accompanying drawings.

FIG. 5 is a diagram illustrating an algorithm for performing a splitting operation of input feature data in operation S110 of FIGS. 2 to 4.

FIG. 6 is an exemplary diagram describing data splitted by operation S110 of FIGS. 2 to 5.

FIG. 9 is an exemplary flow diagram of an image processing method according to one or more embodiments of the inventive concept.

DETAILED DESCRIPTION

Embodiments of the inventive concept will be described below in more detail with reference to the accompanying drawings. In the following descriptions, details such as detailed configurations and structures are provided merely to assist in an overall understanding of embodiments of the inventive concept. Modifications of the embodiments described herein can be made by those skilled in the art without departing from the spirit and scope of the inventive concept. Furthermore, descriptions of well-known functions and structures are omitted for clarity and brevity. The terms used in this specification are defined in consideration of the functions of the inventive concept and are not limited to specific functions. Definitions of terms may be determined based on the description in the detailed description.

In the following drawings or the detailed description, modules may be connected to others in addition to the components illustrated in drawing or described in the detailed description. The modules or components may be directly or indirectly connected. The modules or components may be communicatively connected or may be physically connected.

Unless defined otherwise, all terms including technical and scientific terms used herein have the same meaning as can be understood by one of ordinary skill in the art to which the inventive concept belongs. Generally, terms defined in the dictionary are interpreted to have equivalent meaning to the contextual meanings in the related art and are not to be construed as having ideal or overly formal meaning unless expressly defined in the text.

Figure 1:
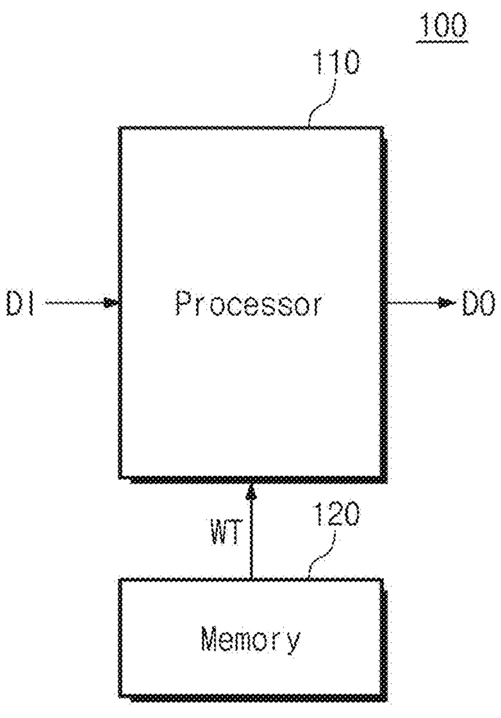
FIG. 1 is a block diagram of a neural network system according to one or more embodiments of the inventive concept.

FIG. 1 is a block diagram of a neural network system according to one or more embodiments of the inventive concept. A neural network system 100 may generate output feature data DO by processing input feature data DI, based on a neural network. Referring to FIG. 1, the neural network system 100 includes a processor 110 and a memory 120.

The processor 110 may process and analyze the input feature data DI, based on the neural network implemented according to one or more embodiments of the inventive concept. The processor 110 may be a graphics processing unit (GPU). Since the GPU is efficient for parallel data processing such as matrix multiplication, the GPU may be used as a hardware platform for learning and inference of the neural network. However, the inventive concept is not limited thereto, and the processor 110 may be a central processing unit (CPU).

The processor 110 may receive a weight parameter group WT from the memory 120. The processor 110 may perform operation of the input feature data DI, based on the weight parameter group WT. The input feature data DI is propagated through the neural network implemented by the processor 110 and may be converted into the output feature data DO by the weight parameter group WT. The processor 110 may generate the output feature data DO as a result of the operation of the input feature data DI.

The neural network implemented by the processor 110 splits the input feature data DI in units of a bit, and the splitted data is propagated independently through a binary neural network. Through this, the neural network may have both advantages of the binary neural network and advantages of multi-bit processing. Detailed description of the neural network will be described later.

The memory 120 may be configured to store the weight parameter group WT. For example, the weight parameter group WT may include activation values and weights corresponding to each of layers of the neural network. For example, the memory 120 may be implemented as a volatile memory such as a DRAM, an SRAM, etc., or a nonvolatile memory such as a flash memory, an MRAM, etc.

Figure 2:
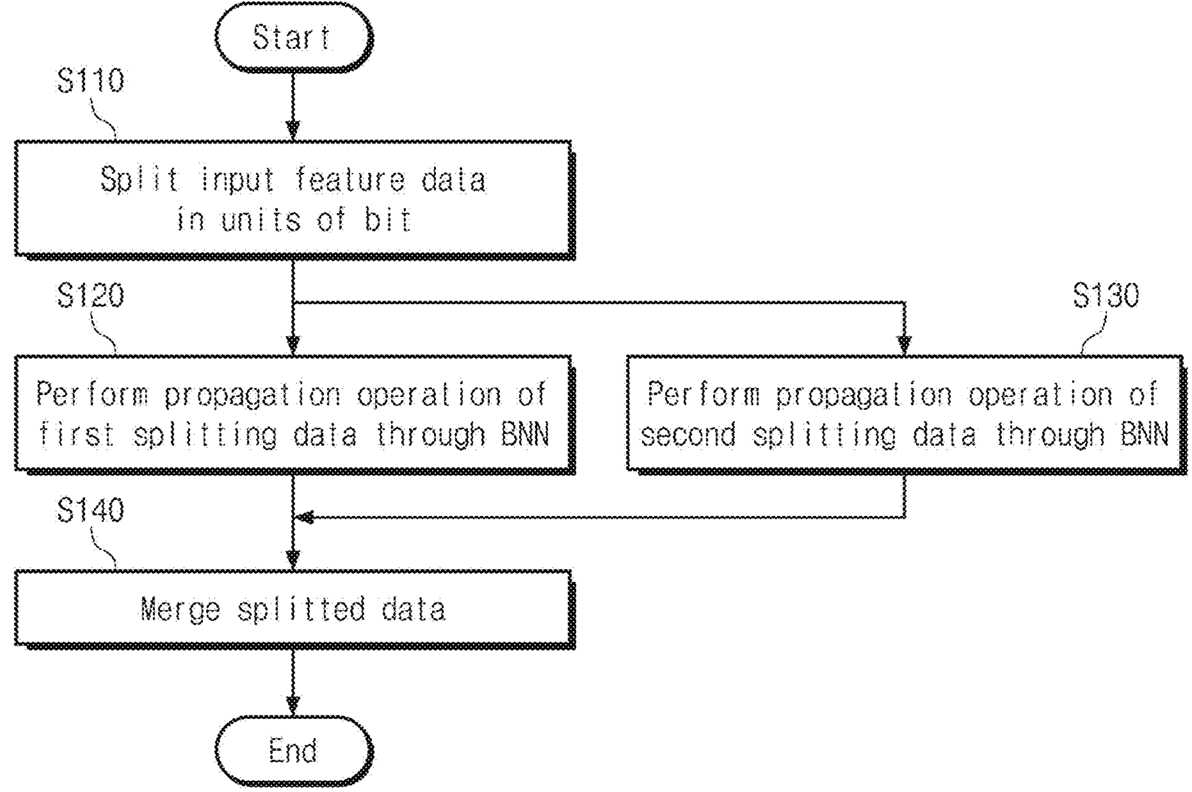
FIG. 2 is an exemplary flowchart describing an operating method of a neural network system of FIG. 1.

FIG. 2 is an exemplary flowchart describing an operating method of a neural network system of FIG. 1. Each operation of FIG. 2 may be operated by the processor 110 of FIG. 1. FIG. 2 illustrates a process in which the neural network according to one or more embodiments of the inventive concept processes the input feature data DI as illustrated in FIG. 1 to generate the output feature data DO. For convenience of description, FIG. 2 will be described with reference to reference numerals in FIG. 1.

In operation S110, the input feature data DI are splitted in units of the bit. The processor 110 may split the input feature data DI, based on a set bit precision. For example, when the set bit precision is 2, the processor 110 may split the input feature data DI into first and second splitting data. In this case, the first splitting data may correspond to a first digit (e.g., most significant bit (MSB)), and the second splitting data may correspond to a second digit (e.g., least significant bit (LSB)). However, the number of the splitting data is not limited to two, and the input feature data DI may be splitted by a number greater than two. According to the set bit precision, the processor 110 may split the input feature data DI into various numbers, such as first to third splitting data or first to fourth splitting data. A detailed description of a split of the input feature data DI will be described later in detail with reference to FIGS. 4 and 5.

In operation S120, the first splitting data is propagated through a first binary neural network. In the first binary neural network, a binary activation function or the weight parameter group WT including a weight represented by 1-bit data may be used. Since a binary value is used, a computation amount of the first splitting data of the processor 110 may decrease, and a usage amount of the memory 120 may decrease. As a result of propagation of the first splitting data, the processor 110 may generate first result data.

In operation S130, the second splitting data is propagated through a second binary neural network. In the second binary neural network, the binary activation function or the weight parameter group WT including the weight represented by 1-bit data may be used. The weight parameter group WT may be shared by the first binary neural network and the second binary neural network. Accordingly, the calculation amount of the processor 110 may decrease, and the usage amount of the memory 120 may decrease. As a result of propagation of the second splitting data, the processor 110 may generate second result data.

Operation S120 is performed independently of operation S130. That is, the propagation operation of the first splitting data and the propagation operation of the second splitting data are independently performed without being related to each other. In operations S120 and S130, the operation of the first splitting data does not affect the operation of the second splitting data, and the operation of the second splitting data does not affect the operation of the first splitting data. In addition, when the input feature data DI are splitted by a number greater than 2, a propagation operation of third splitting data may be further performed independently of operations S120 and S130. In this case, the operation of the third splitting data does not affect operations of the first and second splitting data.

When image classification and object recognition are performed from the input feature data DI that are image data, bits of different digits may have meaningful information independently. Details of this will be described later in FIG. 6. In this case, an accuracy of the output feature data DO when data splitted in units of the bit is independently operated may be similar to an accuracy of the output feature data DO when the splitted data are correlated with each other. In addition, the processing speed and the memory usage when the splitted data are independently operated may be significantly improved than that when the splitted data are correlated with each other.

In operation S140, the first result data by propagation of the first splitting data and the second result data by propagation of the second splitting data are merged with each other. The processor 110 may consider an importance of the first result data and may multiply the first result data by a first weight. The processor 110 may consider an importance of the second result data and may multiply the second result data by a second weight. The first and second result data multiplied by the weights may be added, and as a result, the output feature data DO may be generated. The first and second weights may be included in the weight parameter group WT described above.

Figure 3:
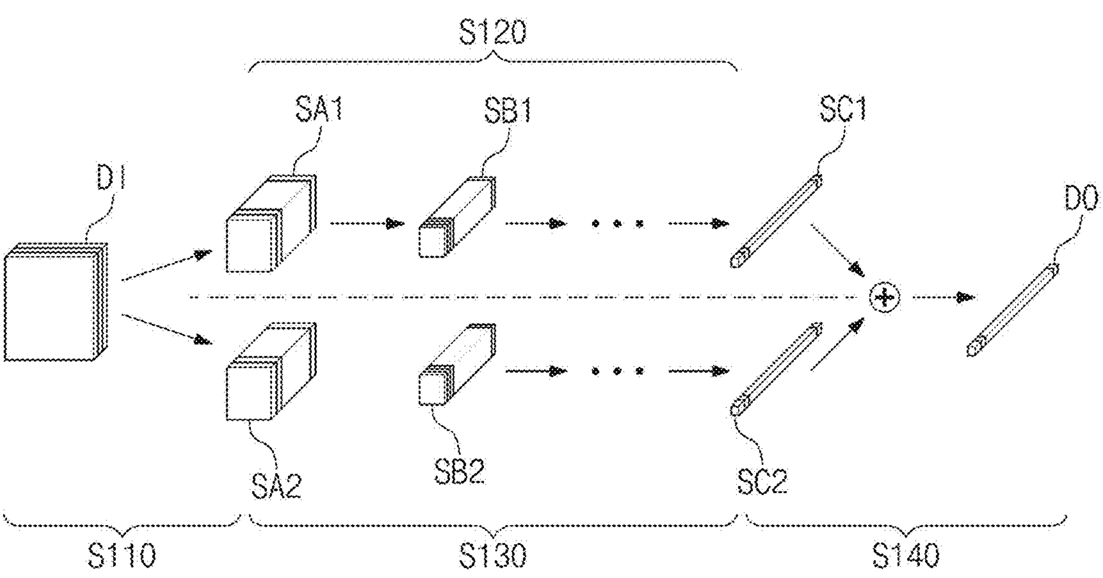
FIG. 3 is a diagram exemplarily illustrating a neural network described in FIGS. 1 and 2.

FIG. 3 is a diagram exemplarily illustrating a neural network described in FIGS. 1 and 2. FIG. 3 illustrates a process in which the neural network implemented by the processor 110 of FIG. 1 performs each operation of FIG. 2. Operations S110 to S140 illustrated in FIG. 3 correspond to operations S110 to S140 in FIG. 2, respectively.

In operation S110, the neural network may split the input feature data DI, based on a set number of bit precision. For example, it is assumed that FIG. 3 splits the input feature data DI into first splitting data SA1 and second splitting data SA2, based on 2-bit precision. However, the inventive concept is not limited thereto, and as described in FIG. 2, the input feature data DI may be split into a number greater than 2. The first splitting data SA1 corresponds to the first digit (e.g., most significant bit (MSB)), and the second splitting data SA2 may correspond to the second digit (e.g., least significant bit (LSB)).

The neural network may include a bit splitting layer for splitting the input feature data DI, and the bit splitting layer may be a first layer of the neural network. In one example, three cube blocks illustrated as the input feature data DI may include a feature map corresponding to a red color, a green color, and a blue color of an image sensor (e.g., a sensor 1600 in FIG. 7), and the feature map may be generated based on pixel values corresponding to the red color, the green color, and the blue color.

The bit splitting layer may convert the input feature data DI into the first splitting data SA1 having a first value or a second value. When a feature value of the input feature data DI is in a first reference range, the first splitting data SA1 having the first value may be generated. When the feature value of the input feature data DI is not in the first reference range, the first splitting data SA1 having the second value may be generated. In one example, the first reference range may be greater than or equal to a half value (e.g., ½) of a valid range that the feature value may have. The first value may be a high level (e.g., ⅔) corresponding to {10, 11}, and the second value may be a low level (e.g., 0) corresponding to {00, 01}.

The bit splitting layer may convert the input feature data DI into the second splitting data SA2 having a third value or a fourth value. When the feature value of the input feature data DI is in a second reference range, the second splitting data SA2 having the third value may be generated. When the feature value of the input feature data DI is not in the second reference range, the second splitting data SA2 having the fourth value may be generated. The second reference range may include a first sub-range that is greater than or equal to a first reference value (e.g., ⅚) greater than the half value of the valid range, and a second sub-range between a second reference value (e.g., ⅙) that is less than the half value of the valid range and the half value. The third value may be the high level (e.g., ⅓) corresponding to {01, 11}, and the fourth value may be the low level (e.g., 0) corresponding to {00, 10}.

In operation S120, the first splitting data SA1 is propagated through the first binary neural network. In addition, in operation S130, the second splitting data SA2 is propagated through the second binary neural network. The neural network includes the first binary neural network and the second binary neural network. The first binary neural network and the second binary neural network propagate data independently of each other. That is, the neural network may process each of the first splitting data SA1 and the second splitting data SA2 by using a bitwise binary activation function.

In operation S120, the first splitting data SA1 may be converted into first result data SC1 through first intermediate data SB1 by the first binary neural network. To this end, the first binary neural network may include at least one convolutional layer. The first binary neural network may generate the first result data SC1 by processing the first splitting data SA1, based on the weight parameter group WT of FIG. 1. The weight parameter group WT may be represented by the binary activation function. Accordingly, when an input data value is in a reference range, a value obtained by multiplying the input data value by the set weight value is output, and otherwise, 0 may be output.

In operation S130, the second splitting data SA2 may be converted into second result data SC2 through second intermediate data SB2 by the second binary neural network. To this end, the second binary neural network may include at least one convolutional layer. The second binary neural network may generate the second result data SC2 by processing the second splitting data SA2, based on the weight parameter group WT described as in operation S120. As in the above description, the weight parameter group WT may be represented by the binary activation function. Accordingly, when the input data value is in the reference range, a value obtained by multiplying the input data value by the set weight value is output, and otherwise, 0 may be output.

In operation S140, the first result data SC1 and the second result data SC2 are merged with each other. The neural network may include a bit merging layer for merging, and the bit merging layer may be a last layer of the neural network. The bit merge layer may multiply the first result data SC1 by the first weight, may multiply the second result data SC2 by the second weight, and may add the multiplied results to each other. The bit merging layer may output the output feature data DO as a multiplication result of the weights and the result data.

Figure 4:
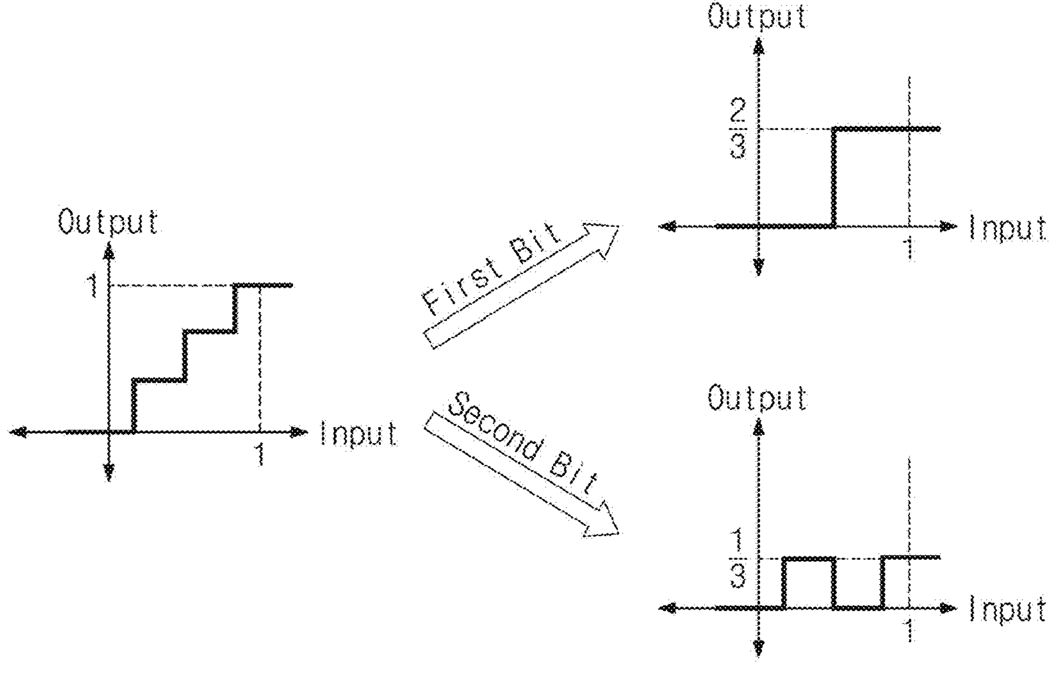
FIG. 4 is an exemplary graph of an activation function used in operation S110 of FIGS. 2 and 3.

FIG. 4 is an exemplary graph of an activation function used in operation S110 of FIGS. 2 and 3. The activation functions illustrated in FIG. 4 are functions for splitting and outputting the input feature data DI in units of the bit. For convenience of description, it is assumed that the activation functions split the input feature data DI, based on the 2-bit precision. The activation functions may split the input feature data DI into the first splitting data corresponding to a first digit bit (first bit) and the second splitting data corresponding to a second digit bit (second bit).

Referring to FIG. 4, when the valid range of the input feature data DI is from 0 to 1, a level of the output data value is illustrated. The existing 2-bit activation function is illustrated on a left side of FIG. 4. Depending on the level of the input feature data DI, data having four levels corresponding to {00, 01, 10, 11} may be output, and for example, the data may have levels of {0, ⅓, ⅔, 1}. When the input feature data DI are splitted into the first and second splitting data, two activation functions may be used.

The activation function corresponding to the first bit is used to generate the first splitting data corresponding to the most significant bit, based on the input feature data DI. For example, a value of ½ or more among the input feature data DI having the valid range from 0 to 1 may be converted to ⅔, and a value less than ½ may be converted to 0. In this case, ½ is the half value of the valid range, and ½ or more may be the first reference range described in FIG. 3. The value ½ or more may be considered as the most significant bit is 1, and the value less than ½ may be considered as the most significant bit is 0. The first splitting data may have the binary value of ⅔ or 0, and may be propagated to the first binary neural network as in operation S120 described above.

The activation function corresponding to the second bit is used to generate the second splitting data corresponding to the least significant bit, based on the input feature data DI. For example, a value of ⅚ or more among the input feature data DI, or a value of from ⅙ to ½ among the input feature data DI may be converted to ⅓, and the remaining values may be converted to 0. In this case, The values of from ⅙ to ½ and ⅚ or more may be the second reference range described in FIG. 3. A value that satisfies the second reference range may be considered to have the least significant bit of 1, and the value that does not satisfy the second reference range may be considered to have the least significant bit of 0. The second splitting data may have the binary value of ⅓ or 0, and may be propagated to the second binary neural network as in operation S130 described above.

The two activation functions are used to split the input feature data DI in units of the bit for use in the binary neural network. The amount of computation for processing the input feature data DI may decrease, and the memory usage may decrease, by using the binary neural network, compared to existing neural networks that process multiple bits.

FIG. 5 is a diagram illustrating an algorithm for performing a splitting operation of input feature data in operation S110 of FIGS. 2 to 4. As an example, the algorithm illustrated in FIG. 5 may be programmed to implement the bit splitting layer of FIG. 3 or the activation functions of FIG. 4. The algorithm of FIG. 5 is exemplary, and a splitting operation in units of the bit of the input feature data according to the inventive concept is not limited by FIG. 5.

Referring to FIG. 5, the number of bits is defined as "k" bits, and the number of the activation functions or the number of the splitting data may be "k". When the embodiments of FIGS. 3 and 4 are applied, "k" will be 2. However, a value of "k" may be greater than 2, and in this case, the number of final output values yi returned may be greater than 2. That is, the number of data to be splitted may be variously provided depending on the number of bits.

λ1 and λ2 are arbitrary parameters for a bit splitting operation, λ1 may be initialized to $2^k-1$, and λ2 may be initialized to 0. A weight βi is defined as a weight of i-th activation function, and the activation function may be configured to output 0 or the weight βi. In this case, the valid range of the input feature data DI is defined from 0 to 1, based on a ReLU1(x) function. Hereinafter, for convenience of description, the algorithm will be described on the assumption that "k" is 2.

In a first activation function (i=1), since λ2 is set to $2^{k-1}$ that is, 2, β1 is set to ⅔. That is, the set value corresponds to an output value ⅔ of the activation function corresponding to the first bit in FIG. 4. An output value y1 is calculated by a Modulo (Floor (1/λ2*round (λ1*x), 2)) function, and has the binary value of 0 or 1. The final output value y1 has the binary value of 0 or ⅔ because the binary value of 0 or 1 is multiplied by the weight β1. The final output value y1 is the same as the activation function corresponding to the first bit in FIG. 4.

In a second activation function (i=2), since λ2 is set to $2^{k-2}$, that is, 1, β2 is set to ⅓. That is, the set value corresponds to an output value ⅓ of the activation function corresponding to the second bit in FIG. 4. The output value y2 is calculated by the Modulo (Floor (1/λ2*Round (λ1*x), 2)) function, and has the binary value of 0 or 1. The final output value y2 has the binary value of 0 or ⅓ because the binary value of 0 or 1 is multiplied by the weight β2. The final output value y2 is the same as the activation function corresponding to the second bit in FIG. 4.

FIG. 6 is an exemplary diagram describing data splitted by operation S110 of FIGS. 2 to 5. Referring to FIG. 6, a puppy image on a left side corresponds to the input feature data DI of FIG. 3, and an image of an upper right side corresponds to the first splitting data SA1 of FIG. 3. An image of a lower right side corresponds to the second splitting data SA2 of FIG. 3. As mentioned above, the first splitting data SA1 corresponds to the first digit bit (e.g., most significant bit), the second splitting data SA2 may correspond to the second digit bit (e.g., a subsequent digit bit of the most significant bit).

In the image corresponding to the first splitting data SA1, a dog is clearly distinguished from a background. In addition, in the second splitting data SA2, features such as the dog's eyes, nose, and ears are prominent. In general, it has been known that bits other than the most significant bit have significant information when the bits other than the most significant bit are combined with the most significant bit. However, in a data analysis such as image classification or object recognition, it is shown that the bits of each digit may have meaningful information independently, as in the images of FIG. 6. In this case, although the data splitted in units of the bit are not correlated with each other and are independently processed, the accuracy of the output feature data DO may be secured. That is, the neural network according to one or more embodiments of the inventive concept may secure the accuracy of the analysis result while reducing the amount of computation and memory usage.

Figure 7:
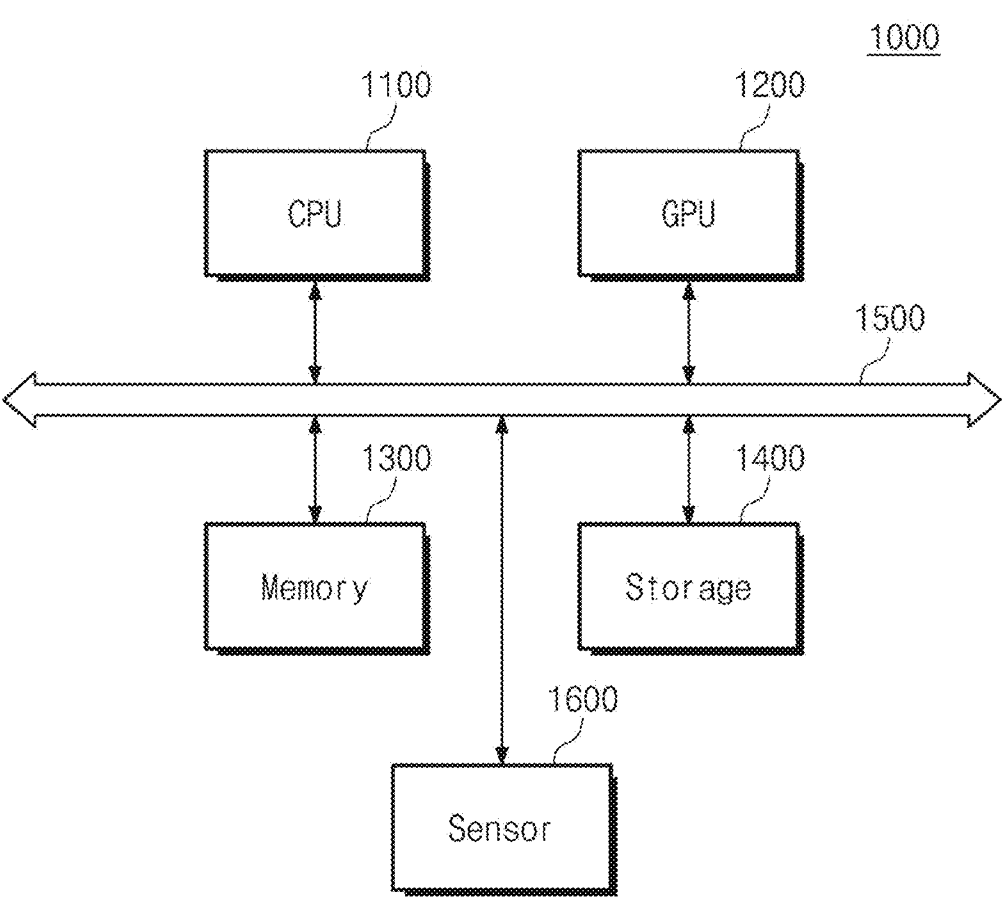
FIG. 7 is an exemplary block diagram of a computing system according to one or more embodiments of the inventive concept.

FIG. 7 is an exemplary block diagram of a computing system according to one or more embodiments of the inventive concept. Referring to FIG. 7, a computing system 1000 includes a central processing unit (CPU) 1100, a graphics processing unit (GPU) 1200, a memory 1300, storage 1400, and a system interconnect 1500. The neural network system 100 of FIG. 1 may be included in the computing system 1000. It will be understood that components of the computing system 1000 are not limited to the components illustrated. For example, the computing system 1000 may further include a hardware codec for processing image data, a display for displaying images, a sensor 1600 for obtaining the image data, etc.

The CPU 1100 executes software (an application program, an operating system, device drivers) to be performed in the computing system 1000. The CPU 1100 may execute the operating system (OS) loaded in the memory 1300. The CPU 1100 may execute various application programs to be run based on an operating system (OS). The CPU 1100 may be provided as a multi-core processor. The multi-core processor may be a computing component having at least two independently drivable processors (hereinafter referred to as 'cores'). Each of the cores may independently read and execute program instructions.

The GPU 1200 performs various graphic operations in response to the request of the CPU 1100. The GPU 1200 may process the input feature data DI of the inventive concept and may convert the input feature data DI into the output feature data DO. In one example, the GPU 1200 may correspond to the processor 110 of FIG. 1. The GPU 1200 may have an operational structure advantageous for parallel processing of data, such as an operation of matrix multiplication. Therefore, the recent GPU 1200 may have a structure that may be used for various operations requiring high-speed parallel processing as well as graphic operations. In one example, the GPU 1200 may perform a general purpose operation other than a graphic processing operation, and the image classification and object recognition described above may be performed.

In the GPU 1200, the neural network described in FIG. 3 may be implemented. In one example, the GPU 1200 may split the input feature data DI in units of the bit and may propagate each of the splitted data independently through the binary neural network. As an example, in the GPU 1200, a CUDA kernel for layers of the bit splitting layer and the binary neural network may be implemented. Data propagated through the CUDA kernel may be merged, and output feature data DO may be generated. According to the neural network structure of the inventive concept, the computation amount and memory usage of the GPU 1200 are reduced, and data analysis performance may be secured depending on the bit splitting.

The operating system (OS) or basic application programs may be loaded in the memory 1300. For example, when the computing system 1000 boots, an OS image stored in the storage 1400 may be loaded into the memory 1300, based on a boot sequence. Various input/output operations of the computing system 1000 may be supported by the OS. As in the above description, the application programs may be loaded into the memory 1300 to be selected by a user or to provide basic services. The application program of the inventive concept may control the GPU 1200 to perform the bit splitting of the GPU 1200, processing of the splitting data through the binary neural network, and a merge operation.

The memory 1300 may correspond to the memory 120 of FIG. 1. The weight parameter group WT described above may be loaded into the memory 1300. For example, the weight parameter group WT stored in the storage 1400 may be loaded into the memory 1300. The weight parameter group WT may include the binary activation function or the weight represented by 1-bit data. Therefore, the inventive concept may have a smaller data size than a weight of the existing neural network that processes the multiple bits, and the usage of the memory 1300 may be reduced.

The memory 1300 may be used as a buffer memory for storing image data (e.g., the input feature data DI) provided from an image sensor (e.g., a sensor 1600) such as a camera. Also, the memory 1300 may be used as a buffer memory for storing the output feature data DO, which is a result of analyzing the input feature data DI. The memory 1300 may be a volatile memory such as a static random access memory (SRAM) or a dynamic random access memory (DRAM), or a nonvolatile memory such as a PRAM, an MRAM, a ReRAM, a FRAM, and a NOR flash memory.

The storage 1400 is provided as a storage medium of the computing system 1000. The storage 1400 may store the application programs, an operating system image, and various data. The storage 1400 may be provided as a memory card (MMC, eMMC, SD, MicroSD, etc.), and may include a NAND-type flash memory or NOR-type flash memory having a large storage capacity. Alternatively, the storage 1400 may include the nonvolatile memory such as the PRAM, the MRAM, the ReRAM, and the FRAM.

The system interconnect 1500 may be a system bus of the computing system 1000. The system interconnect 1500 may provide a communication path among components included in the computing system 1000. The CPU 1100, the GPU 1200, the memory 1300, and the storage 1400 may exchange data with one another through the system interconnect 1500. The system interconnect 1500 may be configured to support various types of communication formats that are used in the computing system 1000.

According to one or more embodiments of the inventive concept, a neural network system and operating method of the same may reduce the computation amount and memory usage, and may improve data analysis performance, by splitting feature data in units of a bit and processing the splitted feature data independently with a binary neural network.

Figure 8:
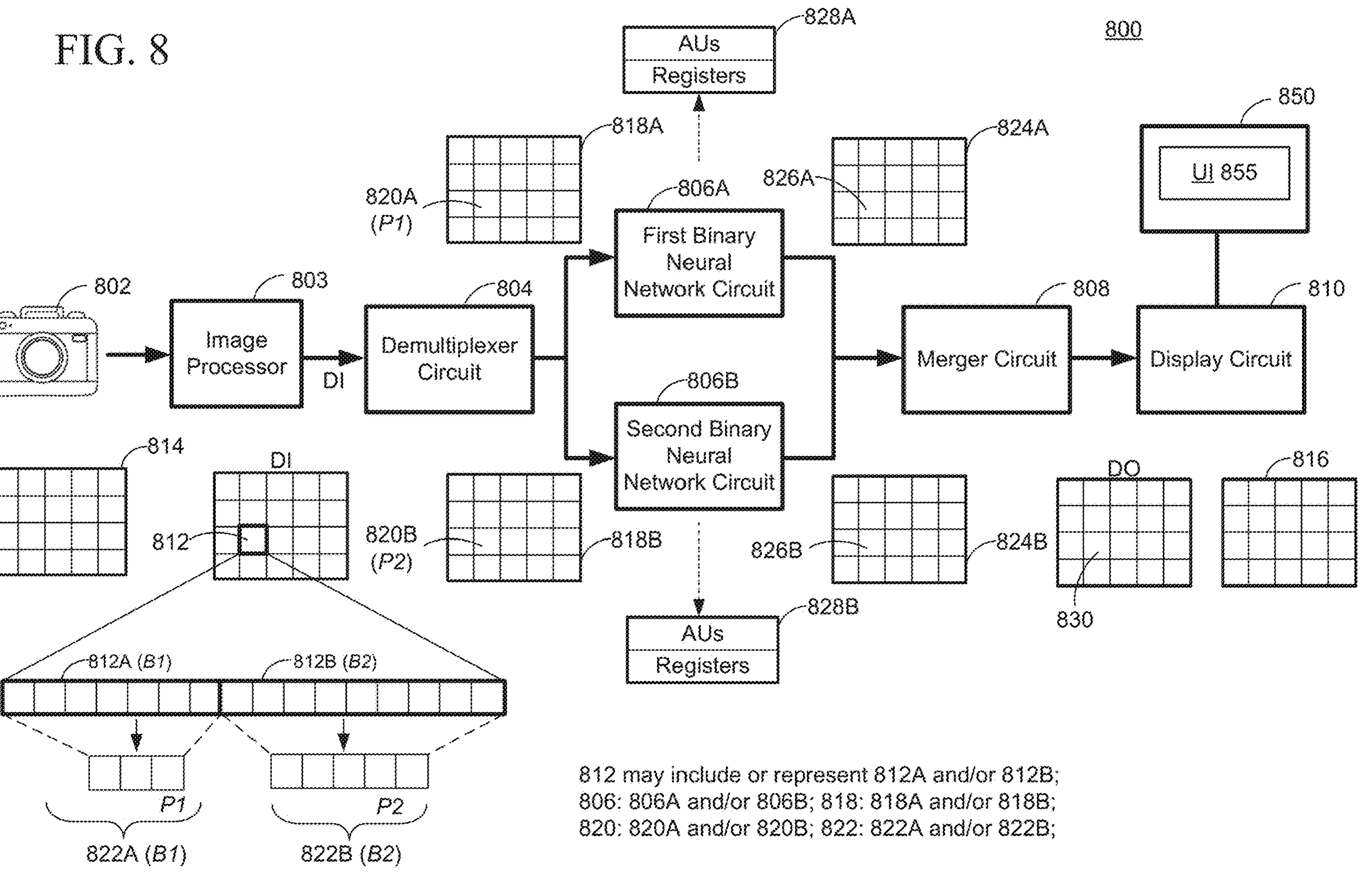
FIG. 8 is an exemplary block diagram of an electronic system according to one or more embodiments of the inventive concept.

FIG. 8 is an exemplary block diagram of an electronic system 800 for processing image data according to one or more embodiments of the inventive concept. The electronic system 800 includes one or more of: a camera 802, an image processor 803, a demultiplexer circuit 804, a plurality of distinct binary neural network circuits 806, a merger circuit 808, and a display circuit 810. In one or more examples, the camera 802 may include, or may be a part of, the sensor 1600 of FIG. 7. In one or more examples, the image processor 803 may include the demultiplexer circuit 804, the plurality of distinct binary neural network circuits 806, the merger circuit 808, and/or the display circuit 810. In one or more examples, the CPU 1100 of FIG. 1 or the GPU 1200 of FIG. 7 may include the image processor 803, the demultiplexer circuit 804, the plurality of distinct binary neural network circuits 806, the merger circuit 808, and/or the display circuit 810. In one or more examples, the electronic system 800 may include a splitter circuit, and the splitter circuit may include, may be a part of, or may be implemented as, the demultiplexer circuit 804. In one or more aspects, a splitter circuit may split or divide an input signal into output signals. In one or more examples, the electronic system 800 and its components (e.g., 802, 803, 804, 806, 808, 810, 828A, 828B, 850 and/or other components) may perform various operations and processes described with reference to other figures, such as FIGS. 1-7 and 9. In one or more examples, the components (e.g., 802, 803, 804, 806, 808, 810, 828A, 828B, 850 and/or other components) of the electronic system 800 may be implemented utilizing hardware, for example, active circuit components (e.g., transistors) and/or passive circuit components (e.g., resistors and capacitors). Active circuit components may include one or more of field effect transistors (FETs) and/or bipolar junction transistors (BJTs).

In one or more embodiments, the camera 802 is configured to capture image data. The image data includes a current image 814 from which the image processor 803 generates input feature data DI including a plurality of current image data items 812. In one or more embodiments, the current image has or corresponds to at least a million image pixels. In one or more embodiments, the current image may have a significant number of image pixels, such as at least nine hundred image pixels, a million image pixels, two million image pixels, five million image pixels, eight million image pixels, or ten million image pixels. In one or more embodiments, the electronic system 800 includes the camera 802, and is configured to process the image data captured by its own camera 802. Alternatively, in one or more embodiments, the electronic system 800 does not include the camera 802, and is configured to obtain the image data from an electronic device (e.g., via one or more communication networks) for further processing. The plurality of current image data items 812 is converted from the current image 814 based on luma components, chroma components, color components (e.g., red, green, or blue component), raw image data components, or a subset thereof. In some implementations, each current image data item 812 is converted to a plurality of image data items 820, which are processed separately using the distinct neural network circuits 806 and combined to generate or recover an output image 816 for display on a display 850 (e.g., on a user interface 855 of an image user application).

The demultiplexer circuit 804 is configured to obtain the input feature data DI including the plurality of current image data items 812, and generate a first image 818A having a plurality of first image data items 820A and a second image 818B having a plurality of second image data items 820B. Each image 818 includes a respective feature map. In one or more embodiments, the demultiplexer circuit 804 is configured to convert each of the plurality of current image data items 812 into (i) a first image data item 820A (corresponding to or having a first set of bits 822A) representing the respective current image data item 812 and (ii) a second image data item 820B (corresponding to or having a second set of bits 822B) representing the respective current image data item 812. The second set of bits 822B is distinct from the first set of bits 822A. The first image data items 820A and the second image data items 820B correspond to two distinct precisions (e.g., 3 bits and 5 bits) less than a precision (e.g., 16 bits) of the current image data items 812. The two distinct precisions of the image data items 820A and 820B are optionally equal to or different from each other. For example, each first image data item 820A has a single bit, and so is each second image data item 820B, while each current image data item 812 has an 8-bit or 16-bit precision. Further, in some situations, each first image data item 820A represents an MSB of a respective current image data item 812 that has the same element location as the respective first image data item 820A, and a respective second image data item 820B at the same element location represents an LSB of the respective current image data item 812. Alternatively, in one or more embodiments, each first set of bits 822A has a number of bits including the MSB of a respective current image data item 812, and each second set of bits 822B has the same number of bits including the LSB of a respective current image data item 812.

In one or more embodiments, each first set of bits 822A is converted from a first portion 812A of a respective current image data item 812 having a first bit number (B1) and including an MSB, and each second set of bits 822B is converted from a second portion 812B of a respective current image data item 812 having a second bit number (B2) of bits and including an LSB. The first bit number (B1) is not equal to the second bit number (B2). Optionally, the first portion 812A does not share any bits with the second portion 812B. Optionally, each of the first and second portions 812A and 812B corresponds to the entire respective current image data item 812. Optionally, the first and second portions 812A and 812B are complementary to each other and form the entire respective current image data item 812 jointly. The precision (e.g., 8 bits) of the current image data items 812 matches (e.g., is equal to) a sum of the first bit number (B1) (e.g., 7) and the second bit number (B2) (e.g., 9). Further, in one or more embodiments, the demultiplexer circuit 804 is configured to apply a first activation function to convert the first portion 812A of each current image data item 812 to the first image data item 820A, and a second activation function to convert a second portion 812B of each current image data item 812 to the second image data item 820B. More details on activation functions are discussed above with reference to FIG. 4.

The plurality of distinct binary neural network circuits 806 is coupled to the demultiplexer 804, and includes at least a first distinct binary neural network circuit 806A and a second distinct binary neural network circuit 806B. The binary neural network circuits 806A and 806B are configured to, based on the two distinct precisions (P1 and P2) of the image data items 820A and 820B, independently and separately, process the first image 818A and the second image 818B to generate a first processed image 824A including a plurality of first processed image data items 826A and a second processed image 824B including a plurality of second processed image data items 826B, respectively. Each element located at an element location corresponds to a first processed image data item 826A associated with the first set of bits 822A representing a current image data item 812 and/or a second processed image data item 826B associated with the second set of bits 822B representing the current image data item 812.

In one or more embodiments, each first image data item 820A has a first number (P1) of bits, and corresponds to a first set of values represented by the first number (P1) of bits. Each second image data item 820B has a second number (P2) of bits, and corresponds to a second set of values represented by the second number (P2) of bits. Stated in another way, the two distinct precisions of the first and second image data items 820A and 820B are represented by the first and second numbers, respectively. The first binary neural network circuit 806A includes a first set of arithmetic units (AUs) and registers 828A configured to implement a first binary neural network with the first number (P1) of bits. The second binary neural network circuit 806B includes a second set of arithmetic units (AUs) and registers 828B configured to implement a second binary neural network with the second number (P2) of bits. The second number (P2) and the first number (P1) are optionally equal to or different from each other. Further, in one or more embodiments, the first set of arithmetic units and registers 828A includes one or more registers of the first number (P1) of bits configured to store a plurality of weights of the first binary neural network, and each weight has the first number (P1) of bits. The second set of arithmetic units and registers 828B includes one or more registers of the second number (P2) of bits configured to store a plurality of weights of the second binary neural network, and each weight has the second number (P2) of bits.

In an example, the first number (P1) is equal to 1, and each first image data item 820A corresponds to two values (e.g., 0 and ⅔). The second number (P2) is equal to 1, and each second image data item 820B corresponds to two values (e.g., 0 and ⅓). Each weight used in the neural network circuits 806 has two values represented by 1 bit. More details on splitting each current image data item 812 to two single bit image data items 820A and 820B are explained above with reference to FIG. 4.

In one or more embodiments, a merger circuit 808 is coupled to the binary neural network circuits 806, and configured to combine each first processed image data item 826A and a respective second processed image data item 826B to generate or recover a respective output image data item 830 of an output feature DO, which is converted to an output image 816 for display. More details on merging the image data items 826A and 826B of the first and second processed images 824A and 824B are discussed above with reference to FIGS. 2 and 3. In one or more embodiments, the merger circuit 808 includes a concatenation circuit configured to concatenate each first processed image data item 826A and the respective second processed image data item 826B, located at an element location to form the respective output image data item 830 corresponding to the same element location.

The display circuit 810 is coupled to the merger circuit 808, and configured to display the output image 816 on a user interface 855 of an image user application. In one or more embodiments, the output image 816 has at least a million image pixels and is generated within less than two seconds of capturing the current image 814. In one or more embodiments, the output image 816 has at least nine hundred image pixels, one million image pixels, two million image pixels, five million image pixels, eight million image pixels, or ten million image pixels and is generated in real time within a short time period, such as less than one second, two seconds, three seconds or four seconds of capturing the current image 814.

In one or more embodiments, before the output image 816 is provided to the display circuit 810 for display, the output image 816 is further processed (e.g., for denoising, adjustment of exposure, and/or adjustment of white balance). In one or more embodiments, the plurality of current image data items 812 corresponds to a region of interest (ROI) in the current image 814, and so do the output image data items 830. Further, in one or more embodiments, the current image 814 is processed to generate a processed image (e.g., using an alternative neural network) without splitting any of the current image data items 812. The output image 816 corresponding to the ROI is combined with the processed image to generate an image corresponding to the current image 814 and provided to the display circuit 810. For example, the output image 816 corresponding to the ROI replaces a counterpart region of the processed image corresponding to the ROI to generate the image provided to the display circuit 810. In another example, the output image 816 corresponding to the ROI is linearly combined with the counterpart region of the processed image corresponding to the ROI based on a weight to generate the image provided to the display circuit 810.

In one or more embodiments, the plurality of binary neural network circuits 806 includes more than two neural network circuits 806 (e.g., three neural network circuits). Each neural network circuit 806 processes an image 818 having image data items 820 corresponding to a respective set of bits 822. For each neural network circuit 806, each of the image data items 820 has a distinct precision that is defined by a number of bits in the respective set of bits 822. In the current image data items 812, the sets of bits 822 (e.g., 822A and 822B) optionally have the same number or different numbers of bits. The image data items 820, for example, have the same precisions or different precisions among different images 818 (e.g., P1 is equal to or different from P2). In an example, each set of data bits 822 has 1 bit, and the precisions of the image data items 818 are 1 bit (P1=P2=1). In another example, each set of data bits 822 has 3 bits, and the precisions of the image data items 818 are 3 bits (P1=P2=3). In yet another example, the sets of data bits 822A or 822B have 3 and 4 bits, respectively, and the precisions of the image data items 818 (e.g., 818A and 818B) are 3 bits and 4 bits (P1=3 and P2=4, respectively.

In one or more embodiments, the distinct precisions of the image data items 820A and 820B are determined based on processing times of the two distinct binary neural network circuits 806A and 806B. In some examples, the two distinct precisions of the image data items 820A and 820B are selected to match processing times of the two distinct binary neural network circuits 806A and 806B (e.g., controlling the processing times within an offset of each other). The two distinct binary neural network circuits 806A and 806B are implemented in parallel, and either one of the two distinct neural network circuits 806A and 806B has no or little wait time for the other one of the two neural network circuits 806A and 806B. Stated in another way, in one or more embodiments, each of the current image data items 812 of the current image 814 is split into a number of portions each having a number of bits (e.g., B1, B2). Each portion is converted to a set of bits 822 corresponding to an image data item 820 of a respective image 818, which has a distinct precision (e.g., P1, P2). The number of sets in each current image data item 812, the number of bits in each set of bits 822, and the precisions of image data items 820 (e.g., P1, P2) of the images 818 are determined to match (e.g., synchronize) the processing times of different binary neural network circuits 806.

In one or more embodiments, the first binary neural network circuit 806A is more complicated than the second binary neural network circuit 806B. The first binary neural network circuit 806A implements a first binary neural network to process the first image data items 820A. The second binary neural network circuit 806B implements a second binary neural network to process the second image data items 820B. The first binary neural network includes more neural network layers, has a larger number of neurons in each layer on average, and provides a higher precision level than the second binary neural network. Each first image data item 820A has a first number (P1) of bits, and each second image data item 820B has a second number (P2) of bits. The first number (P1) is greater than the second number (P2). In an example, the first number (P1) is equal to 8, and the second number (P2) is equal to 4. The first binary neural network has more layers and/or higher precision weights than the second binary neural network. The first image data item 820A corresponds to one or more MSBs representing the image data item 812, and the second image data item 820B corresponds to one or more LSB s representing the image data item 812. As such, the MSBs are processed with a priority, e.g., using more computational and storage resources, compared with LSB s.

FIG. 9 is an exemplary flow diagram of an image processing method according to one or more embodiments of the inventive concept. For convenience, the method 900 is described as being implemented by an electronic system (e.g., an electronic system 800 in FIG. 8). In one or more embodiments, the electronic system 800 includes a single electronic device. The method 900 is, optionally, governed by instructions that are stored in a non-transitory computer readable storage medium and that are executed by one or more processors of the electronic system. Each of the operations shown in FIG. 9 may correspond to instructions stored in a computer memory or non-transitory computer readable storage medium (e.g., memory 120 in FIG. 1, memory 1300 in FIG. 7). The computer readable storage medium may include a magnetic or optical disk storage device, solid state storage devices such as flash memory, or other non-volatile memory device or devices. The instructions stored on the computer readable storage medium may include one or more of: source code, assembly language code, object code, or other instruction format that is interpreted by one or more processors. Some operations in the method 900 may be combined and/or the order of some operations may be changed.

The electronic system obtains (operation 902) image data including a current image and converts the current image to a plurality of current image data items. In one or more embodiments, the plurality of current image data items forms an image feature map generated from the current image based on one of: luma components, chroma components, and color components having a predefined color type (e.g., red, blue, green). The electronic system generates (operation 904) a first image having a plurality of first image data items and a second image having a plurality of second image data items from the current image data items. The first image data items and the second image data items correspond (operation 906) to two distinct precisions (e.g., 3 bits and 5 bits) less than a precision of the current image data items (e.g., 16 bits). Each of the first and second images represents a respective image feature having a lower precision than the current image data items, allowing further processing to be implemented at a faster rate. In one or more embodiments, each of the plurality of current image data items is converted (operation 908) into (i) a first image data item corresponding to a first set of bits representing a respective current image data item and (ii) a second image data item corresponding to a second set of bits representing the respective current image data. The second set of bits is distinct from the first set of bits. In one or more embodiments, a first activation function is applied to convert a first portion of each current image data item to the first image data item, and a second activation function is applied to convert a second portion of each current image data item to the second image data item.

Based on the two distinct precisions, independently and separately, the electronic system applies (operation 910) two distinct neural networks to process the first image and the second image to generate (1) a first processed image including a plurality of first processed image data items and (2) a second processed image including a plurality of second processed image data items, respectively. The electronic system combines (operation 912) each first processed image data item and a respective second processed image data item to generate or recover a respective output image data item associated with an output image and causes (operation 914) to display the output image on a user interface of an image user application.

In one or more embodiments, the plurality of current image data items corresponds to at least a million image pixels, and the output image having at least a million image pixels is generated within less than two seconds of capturing the current image.

In one or more embodiments, each first processed image data item and a respective second processed image data item are combined with each other based on a weight to generate the respective output image data item. Respective output image data items form an output feature map that is further converted to the output image. The output image optionally has the same precision as the current image.

In one or more embodiments, each first image data item has a first number (P1) of bits corresponding to a first precision, and each second image data item has a second number (P2) of bits corresponding to a second precision. Adaptively, based on the two distinct precisions, the electronic system implements a first binary neural network using a first set of arithmetic units and registers configured to operate with the first number (P1) of bits, and implements a second binary neural network using a second set of arithmetic units and registers configured to operate with a second number (P2) of bits. The second number (P2) is distinct from the first number (P1). The two distinct precisions correspond to the first and second numbers of bits. Further, in one or more embodiments, the first set of arithmetic units and registers includes one or more registers of the first number (P1) of bits configured to store a plurality of weights of the first binary neural network, and each weight has the first number (P1) of bits. In an example, the first number (P1) is equal to 1, and the second number (P2) is equal to 1.

In one or more embodiments, the electronic system determines the two distinct precisions (e.g., corresponding to P1 and P2) based on processing times of the two distinct binary neural network circuits. In some examples, the two distinct precisions are selected to match processing times of the two distinct binary neural network circuits (e.g., controlling the processing times within an offset of each other). The two distinct binary neural network circuits are implemented in parallel, and either one of the two distinct neural network circuits has no or little wait time for the other one of the two neural network circuits.

In one or more embodiments, the first set of bits is converted from a first portion of the respective current image data item, and the second set of bits is converted from a second portion of the respective current image data item. The first portion is complementary to the second portion. The precision of the current image data items (e.g., e.g., 16 bits) is optionally a sum of the two distinct precisions (e.g., 5 bits and 11 bits).

In one or more embodiments, the first image data item corresponds to a most significant bit (MSB) representing the respective current image data item, and the second image data item corresponds to a least significant bit (LSB) representing the respective current image data item.

In one or more embodiments, a first binary neural network applied to process the first image data items includes more neural network layers, has a larger number of neurons in each layer on average, and provides a higher precision level than the second binary neural network applied to process the second image data items, and each first image data item has a first number (P1) of bits, and each second image data item has a second number (P2) of bits. The first number (P1) is greater than the second number (P2). Further, in one or more embodiments, the first binary neural network has higher precision weights than the second binary neural network. By these means, in one or more embodiments, MSBs of the current image data items are processed with a priority, e.g., using more computational and storage resources, compared with LSB s of the current image data items.

In one or more embodiments, the electronic system (e.g., 800, 803, 804, 806, 808, or 810) identifies a region of interest (ROI) in the current image, and the ROI includes the plurality of current image data items. Further, in one or more embodiments, the current image is processed to generate a processed image using an alternative neural network without splitting any of the current image data items. The output image corresponding to the ROI is combined with the processed image to provide an image provided to the display circuit and corresponding to the current image. For example, the output image corresponding to the ROI replaces a counterpart region of the processed image corresponding to the ROI to generate the image provided to the display circuit. In another example, the output corresponding to the ROI is linearly combined with the counterpart region of the processed image corresponding to the ROI based on a weight to generate the image provided to the display circuit.

In one or more embodiments, the plurality of current image data items forms an image feature map generated from the current image based on one of: luma components, chroma components, and color components having a predefined color type (e.g., green, blue, red).

In one or more embodiments, the first image data items and the second image data items correspond to two distinct sets of values represented by the first set of bits and the second set of bits. More details on the sets of values are explained above with reference to FIG. 4 where the first set of bits has 1 bit, and the second set of bits has 1 bit.

The electronic system 800 and method 900 described with reference to FIGS. 8 and 9 (that generate first image data items and second image data items corresponding to two distinct precisions less than a precision of the current image data items and that utilize two distinct, independent binary neural network circuits) may perform various operations and processes described with reference to other figures, such as FIGS. 1-7, and such electronic system 800 and method 900 as described herein can improve image processing speed and performance and secure the accuracy of the output image 816 as compared to the current image 814 while reducing the amount of computation and memory usage.

It should be understood that the particular order in which the operations of FIG. 9 have been described are merely exemplary and are not intended to indicate that the described order is the only order in which the operations could be performed. One of ordinary skill in the art would recognize various ways to process image data using binary neural networks as described herein. Additionally, it should be noted that details of other processes described above with respect to FIGS. 1-8 are also applicable in an analogous manner to the method 900 described above with respect to FIG. 9.

The term "at least one" should be understood as including any and all combinations of one or more of the associated listed items. For example, the meaning of "at least one of a first item, a second item, or a third item" denotes the combination of items proposed from two or more of the first item, the second item, and the third item as well as only one of the first item, the second item, or the third item. The expression of a first element, a second elements "and/or" a third element should be understood as one of the first, second and third elements or as any or all combinations of the first, second and third elements. When the term "comprise," "have," "include," "contain," or the like is used with respect to one or more elements, one or more other elements may be added unless a term such as "only" or the like is used. The terms of a singular form may include plural forms unless the context clearly indicates otherwise. The word "exemplary" is used to mean serving as an example or illustration. Embodiments are example embodiments. Aspects are example aspects. "Embodiments," "implementations," "examples," "aspects" and the like should not be construed to be preferred or advantageous over other implementations.

The contents described above are specific embodiments for implementing the inventive concept. The inventive concept may include not only the embodiments described above but also embodiments in which a design is simply or easily capable of being changed. In addition, the inventive concept may also include technologies easily changed to be implemented using embodiments. Therefore, the scope of the inventive concept is not limited to the described embodiments but should be defined by the claims and their equivalents.

While the inventive concept has been described with reference to exemplary embodiments thereof, it will be apparent to those of ordinary skill in the art that various changes and modifications may be made thereto without departing from the spirit and scope of the inventive concept as set forth in the following claims.

What is claimed is:

1. An electronic system, comprising:

a camera configured to capture image data including a current image having at least a million image pixels;

an image processor configured to generate a plurality of current image data items from the current image;

a demultiplexer circuit configured to generate, from the plurality of current image data items, a first image having a plurality of first image data items and a second image having a plurality of second image data items, wherein the demultiplexer circuit is configured to convert each of the plurality of current image data items into (i) a first image data item corresponding to a first set of bits representing a respective current image data item and (ii) a second image data item corresponding to a second set of bits representing the respective current image data item, the second set of bits distinct from the first set of bits, wherein the plurality of first image data items and the plurality of second image data items correspond to two distinct precisions less than a precision of the plurality of current image data items;

at least two distinct binary neural network circuits configured to, based on the two distinct precisions, independently and separately, process the first image and the second image to generate a first processed image including a plurality of first processed image data items and a second processed image including a plurality of second processed image data items, respectively;

a concatenation circuit configured to combine each first processed image data item and a respective second processed image data item to recover a respective output image data item associated with an output image and generate the output image having at least a million image pixels within less than two seconds of capturing the current image; and a display configured to display the output image on a user interface of an image user application.

2. The electronic system of claim 1, wherein each first image data item has a first number of bits, and each second image data item has a second number of bits, and wherein the at least two distinct binary neural network circuits are configured to, adaptively, based on the two distinct precisions:

implement a first binary neural network using a first set of arithmetic units and registers configured to operate with the first number of bits; and implement a second binary neural network using a second set of arithmetic units and registers configured to operate with the second number of bits, the second number distinct from the first number.

3. The electronic system of claim 2, wherein the first set of arithmetic units and registers includes one or more registers of the first number of bits configured to store a plurality of weights of the first binary neural network, and each weight has the first number of bits.

4. The electronic system of claim 3, wherein the first number is equal to 1, and the second number is equal to 1, and wherein each weight is equal to one of two weight values.

5. The electronic system of claim 1, wherein the first set of bits and the second set of bits correspond to two distinct precisions, and the two distinct precisions are determined based on processing times of the at least two distinct binary neural network circuits.

6. The electronic system of claim 1, wherein the first set of bits is converted from a first portion of the respective current image data item, and the second set of bits is converted from a second portion of the respective current image data item, and the first portion is complementary to the second portion.

7. The electronic system of claim 1, wherein the first image data item corresponds to a most significant bit (MSB) representing the respective current image data item, and the second image data item corresponds to a least significant bit (LSB) representing the respective current image data item.

8. The electronic system of claim 7, wherein a first binary neural network applied to process the plurality of first image data items includes more neural network layers, has a larger number of neurons in each layer on average, and provides a higher precision level than a second binary neural network applied to process the plurality of second image data items.

9. The electronic system of claim 1, wherein the plurality of first image data items and the plurality of second image data items correspond to two distinct sets of values represented by the first set of bits and the second set of bits.

10. The electronic system of claim 1, wherein the concatenation circuit is configured to concatenate each first processed image data item and the respective second processed image data item to generate the respective output image data item.

11. An electronic system, comprising:

a camera configured to capture image data including a current image;

an image processor configured to generate a plurality of current image data items from the current image;

a splitter circuit configured to generate, from the plurality of current image data items, a first image having a plurality of first image data items and a second image having a plurality of second image data items, wherein the splitter circuit is configured to split each of the plurality of current image data items into (i) a first image data item corresponding to a first set of bits representing a respective current image data item and (ii) a second image data item corresponding to a second set of bits representing the respective current image data item, the second set of bits distinct from the first set of bits, wherein the plurality of first image data items and the plurality of second image data items correspond to two distinct precisions less than a precision of the plurality of current image data items;

at least two distinct binary neural network circuits configured to independently and separately, process the first image and the second image to generate a first processed image including a plurality of first processed image data items and a second processed image including a plurality of second processed image data items, respectively;

a merger circuit configured to combine each first processed image data item and a respective second processed image data item to generate a respective output image data item associated with an output image; and a display configured to display the output image on a user interface of an image user application.

12. The electronic system of claim 11, wherein each first image data item has a first number of bits, and each second image data item has a second number of bits, and wherein the at least two distinct binary neural network circuits are configured to, adaptively, based on the two distinct precisions:

implement a first binary neural network using a first set of arithmetic units and registers configured to operate with the first number of bits; and implement a second binary neural network using a second set of arithmetic units and registers configured to operate with the second number of bits, the second number distinct from the first number.

13. The electronic system of claim 12, wherein the first set of arithmetic units and registers includes one or more registers of the first number of bits configured to store a plurality of weights of the first binary neural network, and each weight has the first number of bits.

14. The electronic system of claim 13, wherein the first number is equal to 1, and the second number is equal to 1, and wherein each weight is equal to one of two weight values.

15. The electronic system of claim 11, wherein the splitter circuit is configured to apply a first activation function to convert a first portion of each current image data item to the first image data item, and a second activation function to convert a second portion of each current image data item to the second image data item.

16. An electronic system, comprising:

an image processor configured to generate a plurality of current image data items, the plurality of current image data items for being generated from a current image of image data captured;

a splitter circuit configured to generate, from the plurality of current image data items, a first image having a plurality of first image data items and a second image having a plurality of second image data items, wherein the plurality of first image data items and the plurality of second image data items correspond to two distinct precisions less than a precision of the plurality of current image data items;

at least two distinct binary neural network circuits configured to, based on the two distinct precisions, independently and separately, process the first image and the second image to generate a first processed image including a plurality of first processed image data items and a second processed image including a plurality of second processed image data items, respectively; and a merger circuit configured to combine each first processed image data item and a respective second processed image data item to generate a respective output image data item associated with an output image for display.

17. The electronic system of claim 16, wherein each first image data item has a first number of bits, and each second image data item has a second number of bits, the first number less than the second number.

18. The electronic system of claim 16, wherein the electronic system is configured to identify a region of interest (ROI) in the current image, the ROI including the plurality of current image data items.

19. The electronic system of claim 16, wherein the plurality of current image data items forms an image feature map generated from the current image based on at least one of: luma components, chroma components, and color components having a predefined color type.

20. The electronic system of claim 11, wherein the splitter circuit is configured to apply a first activation function to convert a first portion of each current image data item to a respective first image data item, and a second activation function to convert a second portion of each current image data item to a respective second image data item.

* * * * *